(12) United States Patent
Tracht

(10) Patent No.: US 7,607,731 B2
(45) Date of Patent: Oct. 27, 2009

(54) EXTERNAL SIDE BAG TRIM CLOSE OUTS

(75) Inventor: Michael Tracht, Ingolstadt (DE)

(73) Assignee: Lear Corporation, Southfield, MI (US)

( * ) Notice: Subject to any disclaimer, the term of this patent is extended or adjusted under 35 U.S.C. 154(b) by 283 days.

(21) Appl. No.: 11/459,137

(22) Filed: Jul. 21, 2006

(65) Prior Publication Data
US 2008/0018083 A1    Jan. 24, 2008

(51) Int. Cl.
    *A47C 31/00* (2006.01)
(52) U.S. Cl. ............ 297/218.5; 297/223; 297/224; 297/228.1
(58) Field of Classification Search ......... 297/219.1, 297/223, 224, 218.5, 228.1, 228.13
See application file for complete search history.

(56) References Cited

U.S. PATENT DOCUMENTS

| | | | |
|---|---|---|---|
| 5,121,963 A * | 6/1992 | Kwasnik et al. ....... 297/218.5 X |
| 5,749,597 A | 5/1998 | Saderholm | |
| 5,810,390 A | 9/1998 | Enders | |
| 5,890,734 A | 4/1999 | Saderholm | |
| 6,595,591 B2 * | 7/2003 | Fourrey et al. .......... 297/218.5 |

FOREIGN PATENT DOCUMENTS

DE    102004059277 A1 *    8/2006

* cited by examiner

Primary Examiner—Anthony D Barfield
(74) Attorney, Agent, or Firm—Brooks Kushman P.C.

(57) ABSTRACT

A trim close out panel for a vehicle seat having a seat cover. The seat cover has an opening that is covered by the close out panel. The close out panel is formed of a stretchable fabric. The stretchable fabric is attached to opening in the seat cover. An external side impact air bag is assembled to a receptacle in the seat over the close out panel. The close out panel applies a tensioning force to the seat cover around the opening.

20 Claims, 4 Drawing Sheets

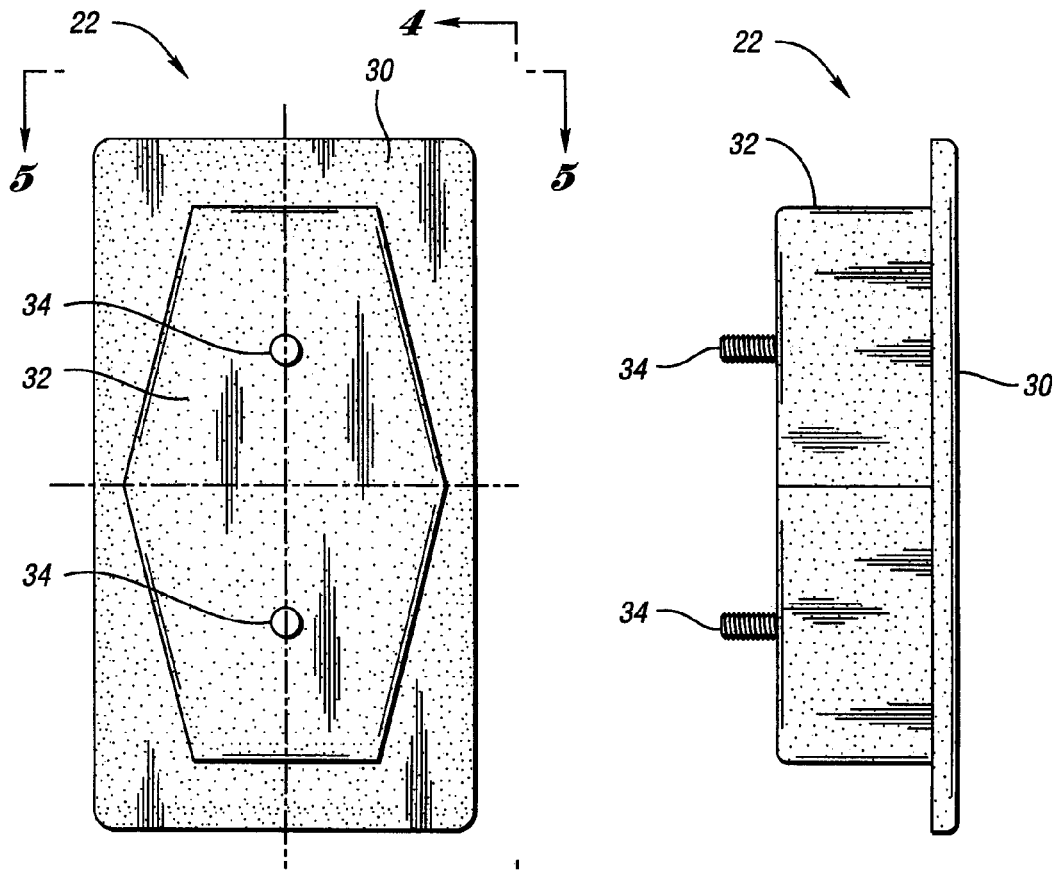
Fig. 3
Fig. 4
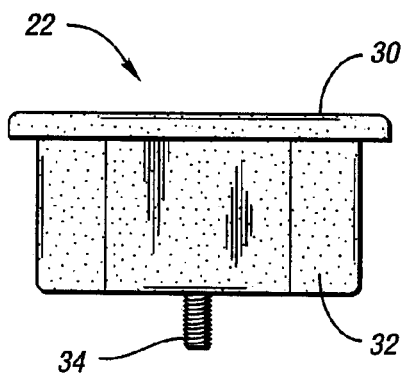
Fig. 5

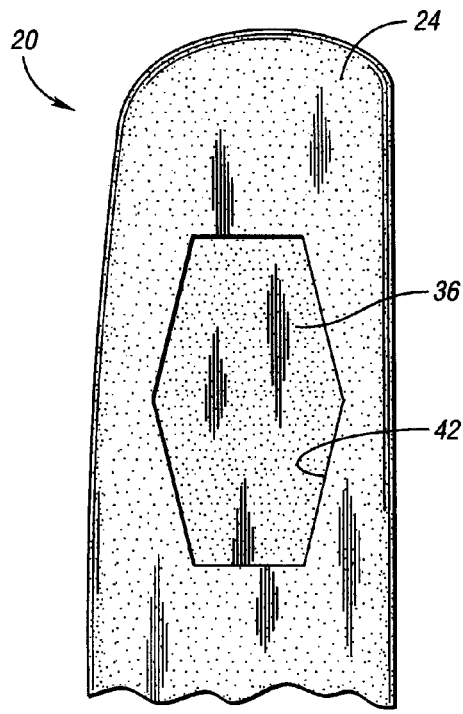
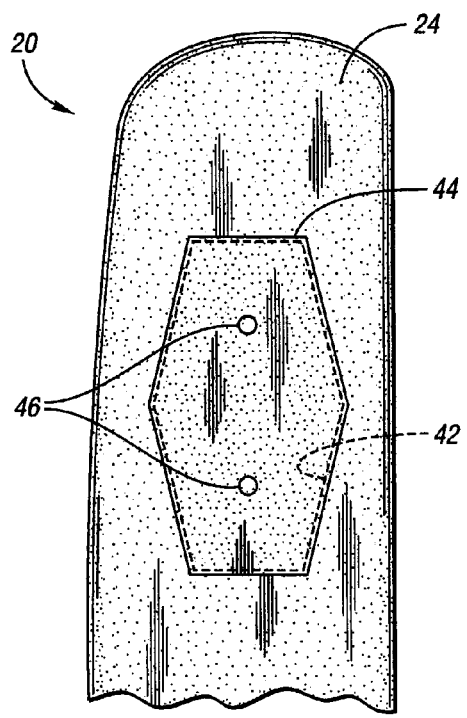
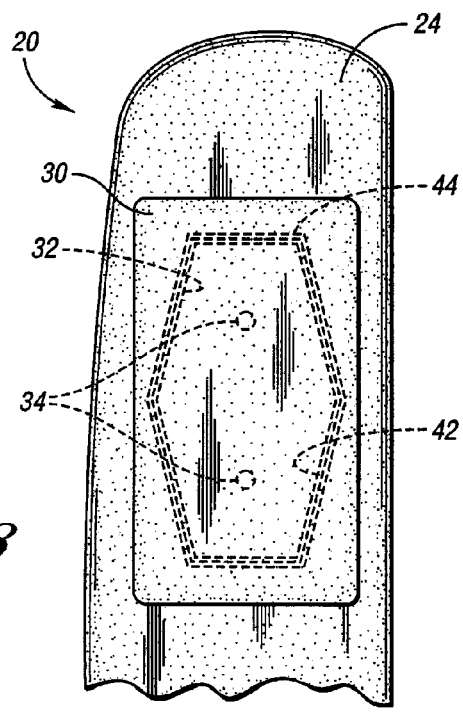

EXTERNAL SIDE BAG TRIM CLOSE OUTS

BACKGROUND OF THE INVENTION

1. Field of the Invention

This invention relates to a trim close out for a vehicle seat having an external side impact air bag assembly.

2. Background Art

Many vehicles now include seat assemblies having side impact air bags. Internal seat mounted side impact air bag assemblies are enclosed within the seat cover. External side air bag assemblies are secured to the seat assembly so that a cover plate of the air bag assembly is visible when viewing the seat assembly.

An opening must be provided through the seat cover so that the external side impact air bag assembly may be secured to the seat assembly. It is desirable to secure the material around the perimeter of this opening to prevent this material from appearing around the periphery of the external side impact air bag assembly.

One problem with external side air bag assemblies is that the seat cover may have wrinkles or surface irregularities around the opening. Another problem with such assemblies is that an edge of the opening may be visible around the assembly.

The present invention is directed to solving the above problems and other problems as summarized below.

SUMMARY OF THE INVENTION

In accordance with at least one aspect of the present invention, a trim closeout is provided for a vehicle seat that has a component, such as an external side air bag assembly. In one embodiment of this invention, a vehicle seat assembly is provided that has a vehicle seat body with a receptacle for such a component. A seat cover is installed on the vehicle seat body. The seat cover has an opening that is aligned with the receptacle. A closeout panel is attached to the seat cover that spans and substantially covers the opening. A component, for example a side impact air bag assembly, is received within the receptacle and secured to the seat body. The closeout panel is disposed between the receptacle and the component. The closeout panel applies a tensioning force to the seat cover about the opening when the component is received and secured within the receptacle.

In accordance with other aspects of the invention, the closeout panel may be secured to the seat cover to be concealed by the component when the component is received and secured within the receptacle. The closeout panel is sewn to the seat cover.

In another implementation of this first embodiment, an opening is provided in the closeout panel to facilitate receiving and securing the component within the receptacle. In a variation of this implementation, the closeout panel may have a plurality openings to facilitate securing the component within the receptacle.

The component may be an external side impact air bag assembly. The external side impact air bag assembly may have a face plate section that is visible when the external side impact air bag assembly is received and secured within the receptacle. The face plate portion may completely conceal the closeout panel when the air bag assembly is received and secured within the receptacle.

In accordance with another aspect of the invention, a seat cover assembly is provided for a vehicle seat assembly that has a receptacle. The seat cover has an opening that is aligned with the receptacle when the seat cover is installed on the vehicle seat assembly. A component is configured to be received in the receptacle. A closeout panel is attached to the seat cover over the opening to substantially cover the opening. The closeout panel is disposed between the receptacle and the component when the component is received within the receptacle and provides a tensioning force to the seat cover in the area of the opening when the component is received within the receptacle.

According to other aspects of the invention, the closeout panel may be formed of an elastic material that is concealed by the component when the component is received and secured within the receptacle. The elastic material may have an opening that facilitates receiving and securing the component within the receptacle. The closeout panel may have a plurality of the openings that facilitate receiving and securing the component within the receptacle. The plurality of openings in the close out panel may be aligned with mounting bolts on the component and bolt holes in the receptacle. The elastic material may be sewn to the seat cover.

In accordance with further aspects of the invention, an automotive seat assembly having a seat bottom attached to a seat back is provided. The seat back has a receptacle for an external side impact air bag assembly. A seat cover having an opening that is aligned with the receptacle and the seat back is also provided. The external side impact air bag is received and secured within the receptacle through the opening. A patch, attached to the seat cover, is also provided, the patch being attached over the opening to substantially cover the opening. The patch is stretched into the receptacle and pulls the seat cover toward the receptacle when the external side impact air bag assembly is received and secured within the receptacle.

According to other aspects of the invention, the patch may have an opening to allow the external side impact air bag assembly to secured within the receptacle. The patch may have a plurality of the openings to allow the external side impact air bag assembly to be secured within the receptacle. The external side impact air bag assembly may further include a face plate that conceals the patch when the side impact air bag assembly is received and secured within the receptacle. The patch may have a plurality of openings through which the external side impact air bag assembly is secured to the receptacle. The patch may be an elastic sheet that corresponds to the shape of the opening in the automotive seat cover.

BRIEF DESCRIPTION OF THE DRAWINGS

FIG. 3 is a bottom plan view of a side impact air bag assembly;

FIG. 4 is an elevational view of the side impact air bag taken along the line 4-4 in FIG. 3;

FIG. 5 is an elevational view of the side impact air bag taken along the line 5-5 in FIG. 3;

FIG. 6 is a fragmentary side elevational view of an automotive seat assembly having an opening in the seat cover;

FIG. 7 is a fragmentary side elevational view of an automotive seat assembly having a side trim close out panel attached over the opening in the seat cover;

FIG. 8 is a fragmentary side elevational view of an automotive seat assembly equipped with the side trim close out panel and a side impact air bag assembly;

DETAILED DESCRIPTION OF THE ILLUSTRATED EMBODIMENT(S)

Reference will now be made in detail to the presently preferred embodiments of the present invention which constitute the best mode of practicing the invention presently known to the inventors. The figures are not necessarily drawn to scale. However, it is to be understood that the disclosed embodiments are merely exemplary of the invention that may be implemented in various and alternative forms. Therefore, specific details disclosed herein are not to be interpreted as limiting, but merely as a representative basis for any aspect of the invention and/or as a representative basis for teaching one skilled in the art to variously employ the present invention.

Figure 1:
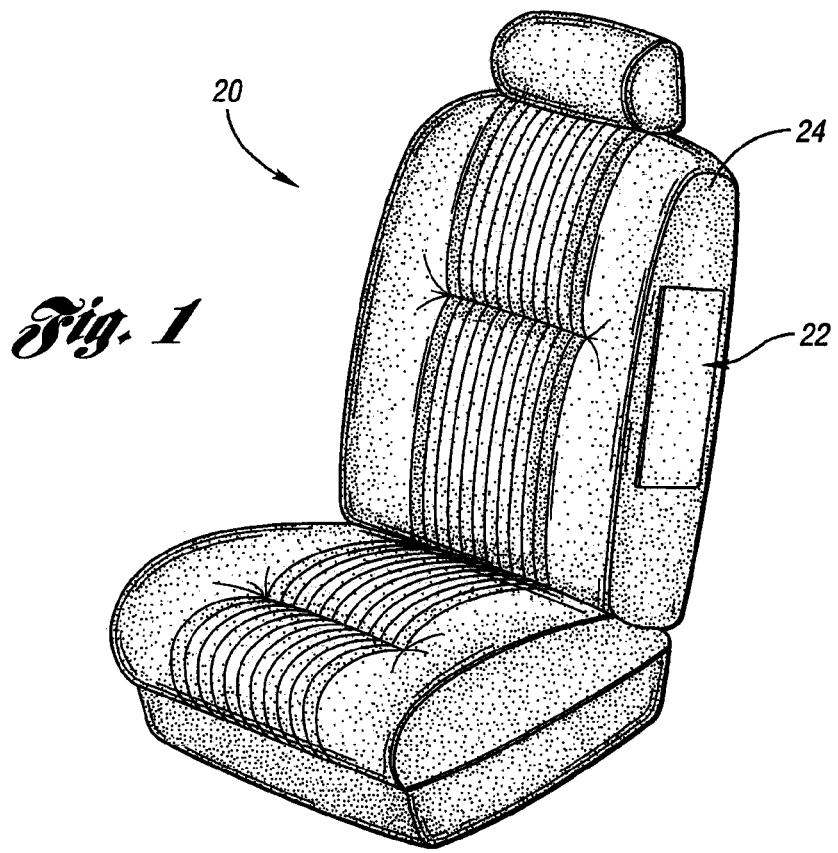
FIG. 1 is a perspective view of an automotive seat assembly equipped with a side impact air bag assembly.

FIG. 1 depicts an automotive seat assembly 20 that is equipped with one example of an external side impact air bag assembly 22. The automotive seat assembly 20 is covered by an automotive seat cover 24.

Figure 2:
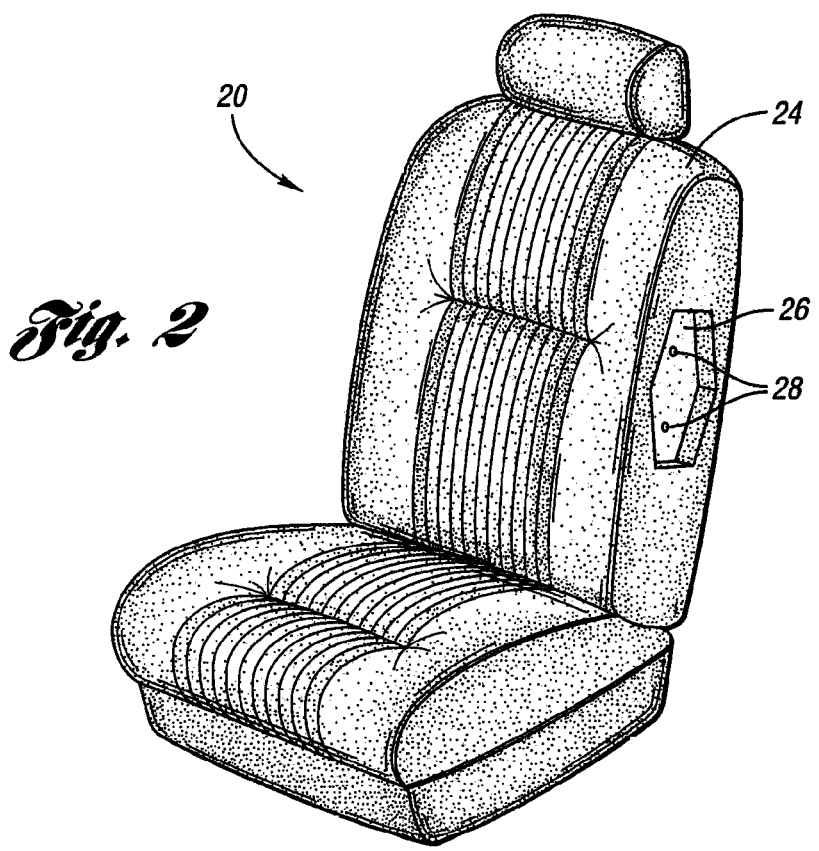
FIG. 2 is a perspective view of the automotive seat assembly of FIG. 1 with the side impact airbag assembly removed.

FIG. 2 depicts the automotive seat assembly 20 of FIG. 1 without the external side impact airbag assembly 22, revealing a receptacle 26 for receiving the external side impact airbag assembly 22. Bolt holes 28 are provided for securing the external side impact airbag assembly 22 to the seat assembly 20. The side impact air bag assembly 22 is depicted in FIGS. 3 through 5. The side impact air bag assembly 22 has a side impact air bag face plate 30, a side impact air bag module 32 and mounting bolts 34. The mounting bolts 34 are used to mount the side impact air bag assembly 22 to the automotive seat assembly 20. When the side impact air bag assembly 22 is attached to the automotive seat assembly 20, only the side impact air bag face plate 30 is visible with the remainder of the assembly 22 being contained within receptacle 26.

The seat cover 24 has an opening 36 which is dimensioned to accommodate the side impact air bag module 32. When the seat cover 24 is installed on the automotive seat assembly 20, the opening 36 is substantially aligned with the receptacle 26. Any excess material from seat cover 24 may be folded into receptacle 26.

The material of the automotive seat cover 24 in the vicinity of the opening 36 is held securely in place so that none of the material from the perimeter 42 of the opening 36 be visible after the side impact airbag assembly 22 is attached to the automotive seat assembly 20. Trim close out 44 is attached to automotive seat cover 24 to ensure that the material at the perimeter 42 remains concealed. Trim close out 44 is made from a stretchable material, preferably elastic, and is attached to automotive seat cover 24 so as to substantially cover the opening 36. Trim closeout 44 may be attached to the automotive seat cover 44 in any manner effective to achieve the attachment, but is preferably sewn onto automotive seat cover 24 at or near the perimeter 42 of the opening 36. The trim close out 44 is attached to automotive seat cover 24 prior to the installation of the automotive seat cover 24 on automotive seat assembly 20. However, the trim close out 44 may be attached to automotive seat cover 24 at any time prior to the attachment of side impact air bag assembly 22.

The trim close out 44 is substantially the same shape as the shape of the perimeter of the opening to the receptacle 26. In embodiments where the opening 36 in the automotive seat cover 24 is substantially the same size and shape as the perimeter of the opening to the receptacle 26, it is also preferable for the trim close out 44 to be only insubstantially larger than the opening 36 in the automotive seat cover 24. In FIG. 7, the perimeter 42 of the opening 36 in the seat cover 24 is shown in phantom lines.

With trim close out 44 in place over the opening 36 in the seat cover 24 and the seat cover attached to the seat assembly 20, the side impact air bag assembly 22 may be attached to the seat assembly 20 by placing it over the trim closeout 44. Pushing the side impact air bag assembly 22 against the trim closeout 44 causes the trim closeout 44 to stretch as the side impact air bag assembly 22 enters the receptacle 26.

FIG. 8 illustrates the arrangement of the trim closeout 44, the perimeter of the opening 42 and the side impact airbag module 32 with the side impact airbag assembly 22 mounted to the automotive seat assembly 20. The side impact air bag assembly 22 has two side impact air bag mounting bolts 34 to secure the side impact air bag assembly 22 to the automotive seat assembly 20. As illustrated in FIG. 7, the trim close out 44 has two holes 46 which correspond to the mounting bolts 34 of the side impact air bag assembly 22 and to the bolt holes 28. The holes 46 in the trim close out 44 permit side impact air bag assembly 22 to be secured to the automotive seat assembly 20 without obstruction. The number and size of holes 28 or other adaptations for attaching an external side impact airbag assembly 22 to an automotive seat assembly 20 will vary depending upon the attachment system.

Figure 9:
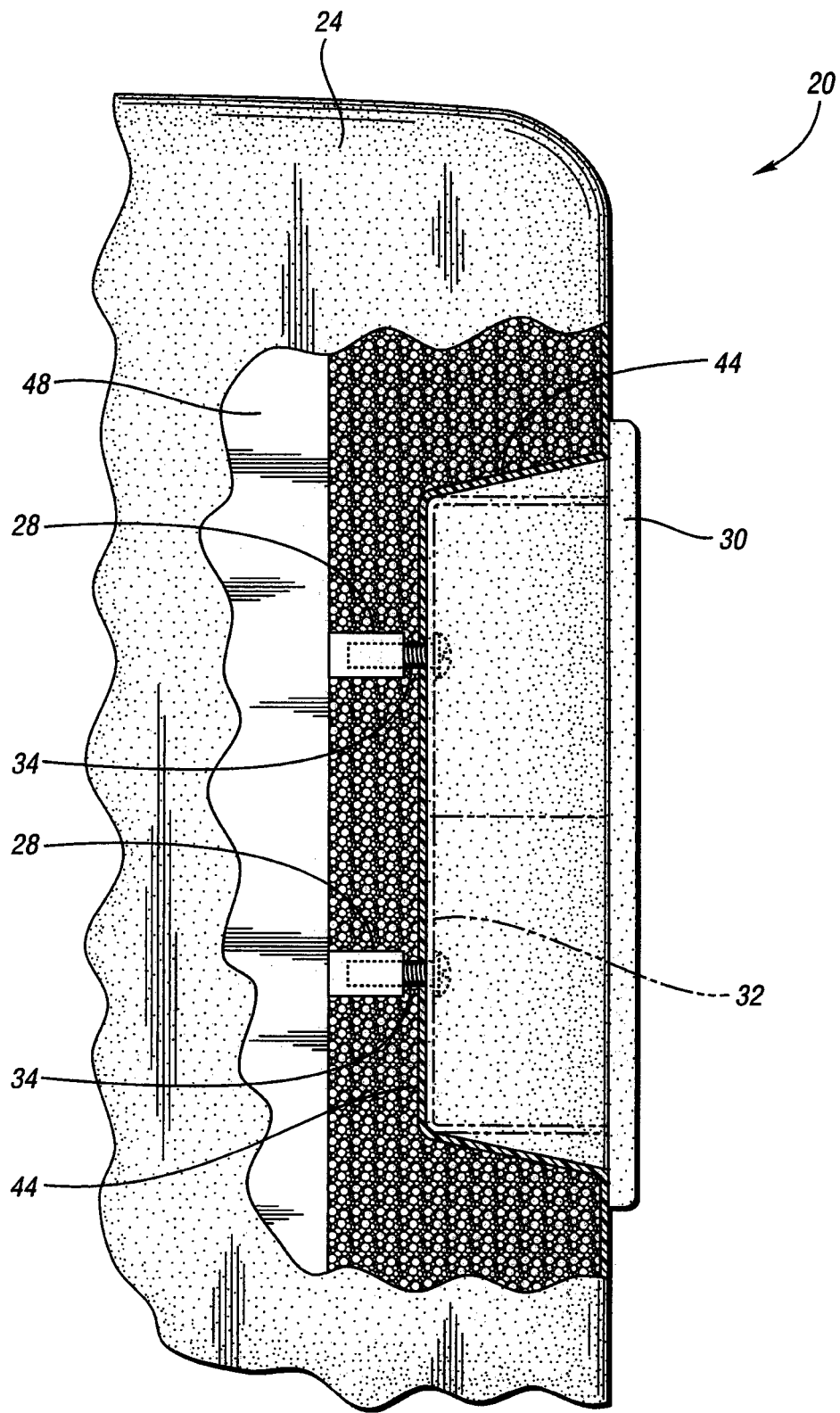
FIG. 9 is a fragmentary, cut away front elevational view of an automotive seat assembly equipped with the side trim close out of the present invention and a side impact air bag assembly.

As best illustrated in FIGS. 8 and 9, the side impact air bag assembly 22 is positioned in the receptacle 26 and secured to the seat frame with the trim close out 44 being stretched into the receptacle. Tension is applied to the material around the perimeter 42 of the opening 36 in the automotive seat cover 24. The tension applied to the seat cover prevents the seat cover from receding. As a result, the material at the perimeter 42 of the opening 36 remains concealed under side impact air bag face plate 30 and is not visible to an observer viewing the automotive seat assembly 20.

While embodiments of the invention have been illustrated and described, it is not intended that these embodiments illustrate and describe all possible forms of the invention. Rather, the words used in the specification are words of description rather than limitation, and it is understood that various changes may be made without departing from the spirit and scope of the invention.

What is claimed is:

1. A seat cover assembly for a vehicle seat having a receptacle for a component, the seat cover assembly comprising:
   a seat cover installed on the vehicle seat that has an opening that is aligned with the receptacle when the seat cover is installed on the vehicle seat; and
   a closeout panel attached to the seat cover over the opening, the closeout panel having at least one opening through which the component is secured within the receptacle;
   wherein the closeout panel is disposed between the receptacle and the component and applies tension to the seat cover in the area of the opening when the component is received within the receptacle.

2. The seat cover assembly of claim 1 wherein the closeout panel is formed of an elastic material.

3. The seat cover assembly of claim 1 wherein the closeout panel is concealed by the component when the component is received and secured within the receptacle.

4. The seat cover assembly of claim 1 wherein the closeout panel has a plurality of openings substantially disposed along an axis.

5. The seat cover assembly of claim 1 wherein the at least one opening in the closeout panel is aligned with at least one mounting bolt on the component and at least one bolt hole in the receptacle.

6. The seat cover assembly of claim 1 wherein the closeout panel is formed of elastic material that is sewn to the seat cover.

7. The seat cover assembly of claim 1 wherein the component is an air bag assembly.

8. The seat cover assembly of claim 1 wherein the seat cover is configured to be installed on a seat back.

9. The seat cover assembly of claim 1 wherein component further comprises a faceplate that conceals the closeout panel when the component is received and secured within the receptacle.

10. The seat cover assembly of claim 1 wherein the seat cover is made of a stretchable material.

11. The seat cover assembly of claim 1 wherein the closeout panel corresponds to the shape of the opening in the seat cover.

12. A seat cover assembly for a vehicle seat having a receptacle for a component, the seat cover assembly comprising:
- a seat cover installed on the vehicle seat that has an opening that is aligned with the receptacle when the seat cover is installed on the vehicle seat; and
- a closeout panel formed of an elastic material attached to the seat cover over the opening;
- wherein the closeout panel is disposed between the receptacle and the component and applies tension to the seat cover in the area of the opening when the component is received within the receptacle.

13. The seat cover assembly of claim 12 wherein the closeout panel includes a through hole.

14. The seat cover assembly of claim 13 wherein the through hole is configured to receive the component.

15. The seat cover assembly of claim 12 wherein the closeout panel stretches when the component is received within the receptacle.

16. The seat cover assembly of claim 12 wherein a portion of the seat cover disposed adjacent to the opening is configured to be concealed by the component.

17. The seat cover assembly of claim 12 wherein the component is an air bag assembly.

18. The seat cover assembly of claim 12 wherein the closeout panel is sewn to the seat cover.

19. The seat cover assembly of claim 12 wherein the closeout panel is configured to be at least partially disposed in the receptacle.

20. The seat cover assembly of claim 12 wherein the seat cover is configured to be folded into the receptacle.

\* \* \* \* \*